(12) United States Patent
Usui

(10) Patent No.: US 11,886,943 B2
(45) Date of Patent: Jan. 30, 2024

(54) LIQUID EJECTION APPARATUS, IMAGE PROCESSING METHOD, AND IMAGE PROCESSING PROGRAM

(71) Applicant: SEIKO EPSON CORPORATION, Tokyo (JP)

(72) Inventor: Masaya Usui, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/938,342

(22) Filed: Oct. 6, 2022

(65) Prior Publication Data

US 2023/0116007 A1 Apr. 13, 2023

(30) Foreign Application Priority Data

Oct. 8, 2021 (JP) ................................. 2021-165957

(51) Int. Cl.
| | | |
|---|---|---|
| *G06K 15/02* | (2006.01) | |
| *G06K 15/00* | (2006.01) | |
| *G06T 7/00* | (2017.01) | |
| *G06T 7/73* | (2017.01) | |
| *G06T 7/90* | (2017.01) | |
| *G06K 15/10* | (2006.01) | |
| *B41J 2/21* | (2006.01) | |

(52) U.S. Cl.
CPC .......... *G06K 15/027* (2013.01); *B41J 2/2142* (2013.01); *B41J 2/2146* (2013.01); *G06K 15/102* (2013.01); *G06K 15/408* (2013.01); *G06T 7/0004* (2013.01); *G06T 7/73* (2017.01); *G06T 7/90* (2017.01); *G06T 2207/30144* (2013.01); *G06T 2207/30204* (2013.01)

(58) Field of Classification Search
CPC .. G06K 15/027; G06K 15/102; G06K 15/408; G06T 7/73; G06T 7/90; G06T 7/0004; G06T 2207/30144; G06T 2207/30204; B41J 2/2142; B41J 2/2146
USPC ....................................... 358/1.14, 1.9, 1.15
See application file for complete search history.

(56) References Cited

U.S. PATENT DOCUMENTS

2013/0100189 A1* 4/2013 Azuma ................. B41J 2/2142
347/14
2014/0347417 A1 11/2014 Murayama et al.

FOREIGN PATENT DOCUMENTS

JP          2015-003515 A    1/2015

* cited by examiner

*Primary Examiner* — Quang N Vo
(74) *Attorney, Agent, or Firm* — Global IP Counselors, LLP

(57) ABSTRACT

A printing unit that prints an inspection image, a reading unit that reads the inspection image printed by the printing unit, and an analysis unit that performs analyzation based on a reading result read by the reading unit are provided. The inspection image includes an inspection pattern of a plurality of colors, the inspection pattern including a first position detection mark printed in a first color, a second position detection mark printed in the first color, and a second color inspection pattern printed in a second color different from the first color, the printing unit prints the second color inspection pattern at a position adjacent to the first position detection mark, and the analysis unit specifies a first position of the first position detection mark in a first region, and specifies a second position of the second position detection mark in a second region smaller than the first region.

10 Claims, 11 Drawing Sheets

LIQUID EJECTION APPARATUS, IMAGE PROCESSING METHOD, AND IMAGE PROCESSING PROGRAM

The present application is based on, and claims priority from JP Application Serial Number 2021-165957, filed Oct. 8, 2021, the disclosure of which is hereby incorporated by reference herein in its entirety.

BACKGROUND

1. Technical Field

The present disclosure relates to a liquid ejection apparatus, an image processing method, and an image processing program.

2. Related Art

An image processing method of determining recording defects by using recorded test patterns is known. The ink-jet recording apparatus disclosed in JP-A-2015-3515 prints a non-ejection detection pattern including a detection mark. The detection mark is a mark used for position detection. The ink-jet recording apparatus reads the non-ejection detection pattern and performs a non-ejection detection process on the basis of the result of the reading. The ink-jet recording apparatus determines the ejection defective nozzle by performing the non-ejection detection process.

The detection accuracy of the detection mark may be reduced due to the positional relationship between the position detection mark used for the position detection and the adjacent image, or the influence of the color of the image adjacent to the position detection mark.

SUMMARY

A liquid ejection apparatus of the present disclosure includes a printing unit configured to print an inspection image, a reading unit configured to read the inspection image printed by the printing unit, and an analysis unit configured to perform analyzation based on a reading result read by the reading unit. the inspection image includes an inspection pattern of a plurality of colors, the inspection pattern including a first position detection mark printed in a first color, a second position detection mark printed in the first color, and a second color inspection pattern printed in a second color different from the first color, the printing unit prints the second color inspection pattern at a position adjacent to the first position detection mark, and the analysis unit specifies a first position of the first position detection mark in a first region, and specifies a second position of the second position detection mark in a second region smaller than the first region.

An image processing method of the present disclosure includes printing an inspection image including an inspection pattern of a plurality of colors including a first position detection mark formed in a first color, a second position detection mark formed in the first color, and a second color inspection pattern formed in a second color different from the first color such that the second color inspection pattern is disposed at a position adjacent to the first position detection mark, acquiring a reading result by reading the inspection image, specifying a first position of the first position detection mark in a first region, and specifying a second position of the second position detection mark in a second region smaller than the first region.

A non-transitory computer-readable storage medium storing an image processing program of the present disclosure executed by a processor of a liquid ejection apparatus configured to print an inspection image, the image processing program being configured to print the inspection image including an inspection pattern of a plurality of colors including a first position detection mark formed in a first color, a second position detection mark formed in the first color, and a second color inspection pattern formed in a second color different from the first color such that the second color inspection pattern is disposed at a position adjacent to the first position detection mark, acquire a reading result by reading the inspection image, specify a first position of the first position detection mark in a first region, and specify a second position of the second position detection mark in a second region smaller than the first region.

DESCRIPTION OF EXEMPLARY EMBODIMENTS

Figure 1:
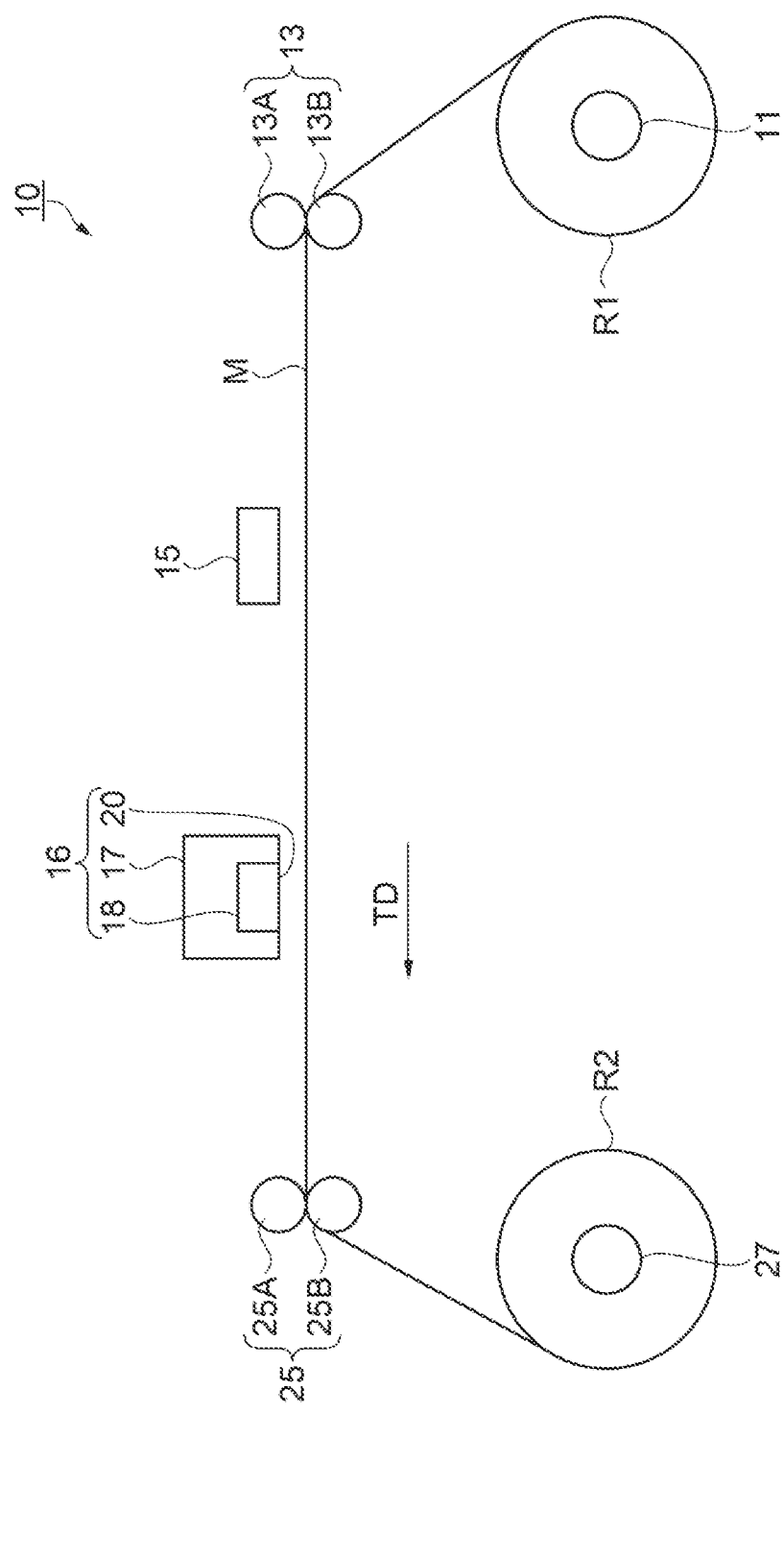
FIG. 1 is a diagram illustrating a schematic configuration of a printing apparatus.
Figure 2:
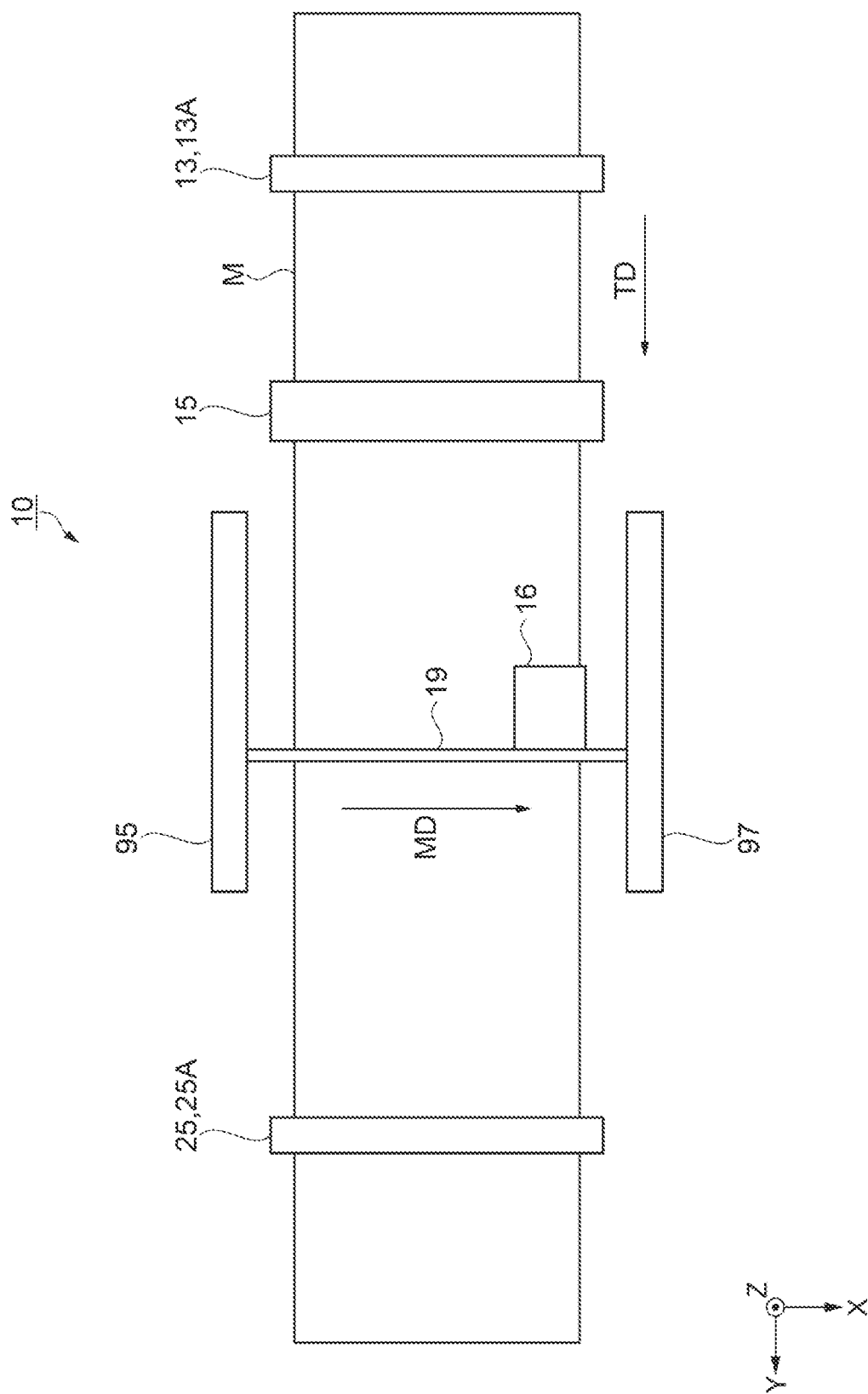
FIG. 2 is a diagram illustrating a schematic configuration of a printing apparatus.

FIG. 1 and FIG. 2 are diagrams illustrating a schematic configuration of a printing apparatus 10. FIG. 1 is a diagram illustrating the printing apparatus 10 as viewed from the +X direction. FIG. 2 is a diagram illustrating the printing apparatus 10 as viewed from the +Z direction. The printing apparatus 10 performs printing on the printing medium M fed from medium roll R1. The printing apparatus 10 is of an ink-jet apparatus that ejects ink to a printing medium M. The printing apparatus 10 corresponds to an example of a liquid ejection apparatus. The printing medium M corresponds to an example of a medium.

Some diagrams including FIG. 1 illustrate an XYZ coordinate system. The X axis, the Y axis, and the Z axis are orthogonal to each other. The X axis is parallel to the installation surface of the printing apparatus 10. The X axis is an axis that is parallel to the rotation axis of a medium roll R1 placed in the printing apparatus 10. The rotation axis of the medium roll R1 is a virtual rotation central axis of the rotating medium roll R1. The direction from the far side toward the near side in FIG. 1 is the +X direction. The direction from the near side toward the far side in FIG. 1 is the −X direction. The Y axis is parallel to the installation surface of the printing apparatus 10. The Y axis is an axis orthogonal to the rotation axis of the medium roll R1. The direction from right to left of the printing apparatus 10 illustrated in FIG. 1 is the +Y direction. The direction from left to right of the printing apparatus 10 illustrated in FIG. 1 is the −Y direction. The Z axis is an axis perpendicular to the installation surface of the printing apparatus 10. The upward direction from the installation surface is the +Z direction. The direction toward the installation surface from above is the −Z direction.

FIG. 1 and FIG. 2 illustrate units disposed along the printing medium M. The printing apparatus 10 illustrated in FIG. 1 and FIG. 2 includes a feed shaft 11, a feed roller pair 13, a reading sensor 15, a printing mechanism 16, a conveyance roller pair 25, and a winding shaft 27.

The feed shaft 11 supports the medium roll R1 composed of the printing medium M wound in a roll form. The feed shaft 11 is supported in a rotatable manner. The feed shaft 11 may be connected to a rotation driving mechanism not illustrated in the drawing. The rotation driving mechanism rotates the feed shaft 11. The rotated feed shaft 11 feeds the printing medium M wound around the medium roll R1.

The feed roller pair 13 feeds the printing medium M toward the printing mechanism 16. The direction in which the printing medium M is conveyed at the position facing the printing mechanism 16 is hereinafter referred to as conveyance direction TD. The feed roller pair 13 sandwiches the printing medium M. The feed roller pair 13 includes a first feed roller 13A and a second feed roller 13B. The first feed roller 13A is disposed at a position on the +Z direction side of the second feed roller 13B. The first feed roller 13A makes contact with the +Z direction side surface of the printing medium M. The second feed roller 13B makes contact with the −Z direction side surface of the printing medium M. The first feed roller 13A and the second feed roller 13B sandwich the printing medium M. One of the first feed roller 13A and the second feed roller 13B is connected to a driving mechanism not illustrated in the drawing. One of the first feed roller 13A and the second feed roller 13B is rotated by the driving force of the driving mechanism. The other of the first feed roller 13A and the second feed roller 13B is rotated to follow. With the driving force of the driving mechanism, the feed roller pair 13 feeds the printing medium M toward the printing mechanism 16. In addition, the feed roller pair 13 conveys the printing medium M in the direction opposite to the conveyance direction TD.

The reading sensor 15 reads the surface of the printing medium M. The reading sensor 15 is composed of an image sensor such as a contact image sensor (CIS) and a charge coupled device (CCD). The reading sensor 15 illustrated in FIG. 1 reads the entire width parallel to the X axis of the printing medium M. In the printing apparatus 10 illustrated in FIG. 1 and FIG. 2, the reading sensor 15 reads the printing medium M located between the feed roller pair 13 and the printing mechanism 16. The printing apparatus 10 illustrated in FIG. 1 and FIG. 2 conveys the printing medium M in the direction opposite to the conveyance direction TD. The reading sensor 15 reads the printing medium M conveyed in the direction opposite to the conveyance direction TD. The reading sensor 15 reads an image such as a test pattern image 100 printed by the printing mechanism 16 on the printing medium M. The test pattern image 100 will be described later. The position of the reading sensor is not limited to the position between the feed roller pair 13 and the printing mechanism 16. The reading sensor 15 may be disposed at a position between the printing mechanism 16 and the conveyance roller pair 25 on the conveyance path of the printing medium M. The reading sensor 15 corresponds to an example of a reading unit.

The reading sensor 15 includes a light emission unit and a light reception unit not illustrated in the drawing. The light emission unit emits red light, green light and blue light in a sequentially switching manner. The light reception unit receives reflected light from the printing medium M when the light emission unit emits the light of each color. The light reception data obtained when red light is emitted by the light emission unit is referred to as red channel. The red channel is image data obtained by extracting red component. The light reception data obtained when green light is emitted by the light emission unit is referred to as green channel. The green channel is image data obtained by extracting green component. The light reception data obtained when blue light is emitted by the light emission unit is referred to as blue channel. The blue channel is image data obtained by extracting blue component. The read data generated by the reading sensor 15 is image data including the red channel, the green channel, and the blue channel. Any of the red channel, the green channel, and the blue channel corresponds to an example of a first channel and a second channel.

The printing mechanism 16 prints images on the printing medium M. The printing mechanism 16 forms images by ejecting ink to the printing medium M. The printing mechanism 16 includes a carriage 17 and a printing head 18 as illustrated in FIG. 1. The printing head 18 includes a plurality of ink nozzles 20. The printing mechanism 16 is supported by a carriage support shaft 19 illustrated in FIG. 2. The printing mechanism 16 illustrated in FIG. 1 and FIG. 2 moves the carriage 17, but this is not limitative. The printing mechanism 16 may be of a line head type that fixes the printing head 18 with respect to the printing medium M at the time of printing. The printing mechanism 16 corresponds to an example of a printing unit. The ink corresponds to an example of liquid.

The carriage 17 supports the printing head 18. The carriage 17 moves in a movement direction MD or the direction opposite to the movement direction MD along the carriage support shaft 19 illustrated in FIG. 2. When the carriage 17 moves, the printing mechanism 16 moves with respect to the printing medium M. The carriage support shaft 19 illustrated in FIG. 2 is parallel to or approximately parallel to the X axis. The carriage 17 moves in the +X direction and the −X direction with respect to the printing medium M. When the carriage 17 moves, the printing mechanism 16 causes the ink nozzle 20 to scan with respect to the printing medium M. As illustrated in FIG. 2, the +X direction is the movement direction MD, and corresponds to an example of a first direction. The movement direction MD may be the −X direction. The carriage 17 is moved by the driving force of the carriage driving mechanism not illustrated in the drawing. The carriage 17 corresponds to an example of an ejection unit driving mechanism. In the printing apparatus 10 illustrated in FIG. 1 and FIG. 2, the printing mechanism 16 moves with respect to the printing medium M, but this is not limitative. The printing mechanism 16 moves relative to the printing medium M.

The printing head 18 is supported by the carriage 17. The printing head 18 includes the plurality of ink nozzles 20 at the printing surface that faces the printing medium M. The ink nozzle 20 can eject the ink to the printing medium M. The ink nozzle 20 corresponds to an example of a nozzle. The configuration of the ink nozzle 20 will be described later. Ink of a plurality of colors is supplied to the printing head 18 from an ink tank or an ink cartridge not illustrated in the drawing.

The carriage support shaft 19 supports the carriage 17 in a movable manner. As illustrated in FIG. 2, the carriage support shaft 19 is supported by a first side plate 95 and a second side plate 97. The first side plate 95 is disposed at a position on the −X direction side of the printing medium M that is being conveyed. The second side plate 97 is disposed at a position on the +X direction side of the printing medium M that is being conveyed. The carriage support shaft 19 is supported along the axis intersecting the Y axis. The carriage support shaft 19 illustrated in FIG. 2 is supported in parallel to or approximately parallel to the X axis. The first side plate 95 and the second side plate 97 may support the feed roller pair 13, the reading sensor 15, and the conveyance roller pair 25.

The conveyance roller pair 25 conveys the printing medium M printed by the printing mechanism 16. The conveyance roller pair 25 sandwiches the printing medium M. The conveyance roller pair 25 includes a first conveyance roller 25A and a second conveyance roller 25B. The first conveyance roller 25A is disposed at a position on the +Z direction side of the second conveyance roller 25B. The first conveyance roller 25A makes contact with the +Z direction side surface of the printing medium M. The second conveyance roller 25B makes contact with the -Z direction side surface of the printing medium M. The first conveyance roller 25A and the second conveyance roller 25B sandwich the printing medium M. One of the first conveyance roller 25A and the second conveyance roller 25B may be connected to a driving mechanism not illustrated in the drawing. One of the first conveyance roller 25A and the second conveyance roller 25B is rotated by the driving force of the driving mechanism when connected to the driving mechanism. The other of the first conveyance roller 25A and the second conveyance roller 25B is rotated to follow. The conveyance roller pair 25 guides the printing medium M to a winding roll R2. In addition, the conveyance roller pair 25 may convey the printing medium M in the direction opposite to the conveyance direction TD.

The winding shaft 27 winds, around the winding roll R2, the printing medium M printed by the printing mechanism 16. The winding shaft 27 supports the winding roll R2. The winding shaft 27 is supported in a rotatable manner. The winding shaft 27 may be connected to a rotation driving mechanism not illustrated in the drawing. The rotation driving mechanism rotates the winding shaft 27. The rotated winding shaft 27 winds the printing medium M around the winding roll R2. The winding shaft 27 may wind the printing medium M through a roll core not illustrated in the drawing.

The printing apparatus 10 illustrated in FIG. 1 and FIG. 2 uses the printing medium M wound around the medium roll R1, but this is not limitative. The printing apparatus 10 may use a cut sheet cut into a predetermined size. In the case where the printing apparatus 10 uses the cut sheet, the feed shaft 11 and the winding shaft 27 are changed to a sheet feeding cassette and a paper tray, respectively.

Figure 3:
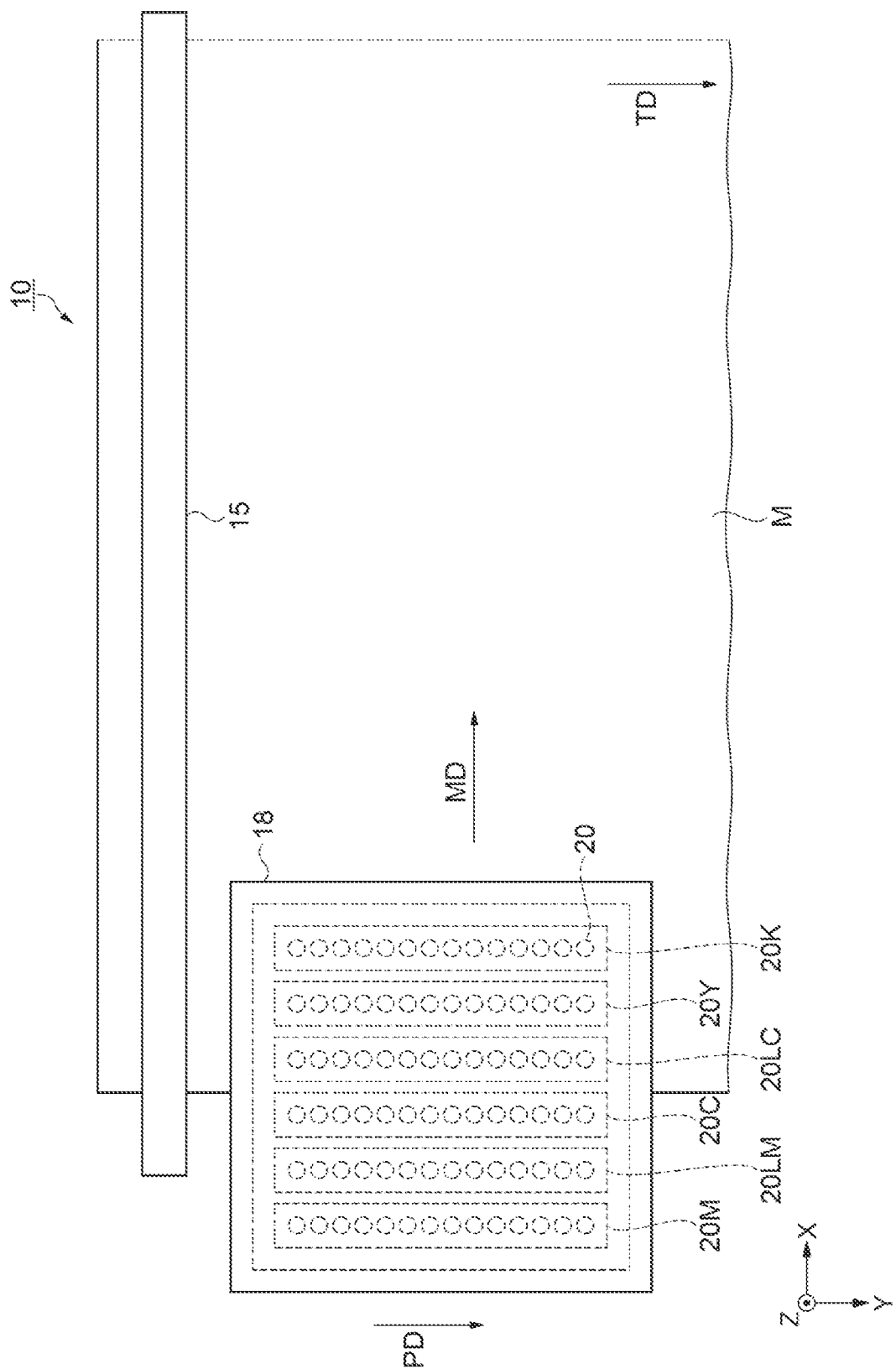
FIG. 3 is a diagram illustrating a relationship between a printing medium and a printing head.

FIG. 3 illustrates a relationship between the printing medium M and the printing head 18. In FIG. 3, the carriage 17 and the carriage support shaft 19 are omitted. FIG. 3 illustrates the reading sensor 15. The printing head 18 illustrated in FIG. 3 prints an image on the printing medium M by moving in the movement direction MD. The movement direction MD illustrated in FIG. 3 corresponds to the +X direction. The plurality of ink nozzles 20 are disposed in the printing surface of the printing head 18 that faces the printing medium M. The plurality of ink nozzles 20 form a plurality of nozzle rows. The ink nozzles 20 illustrated in FIG. 3 form a magenta ink nozzle row 20M, a light magenta ink nozzle row 20LM, a cyan ink nozzle row 20C, a light cyan ink nozzle row 20LC, a yellow ink nozzle row 20Y, and a black ink nozzle row 20K.

The magenta ink nozzle row 20M includes the plurality of ink nozzles 20 arranged along a nozzle arrangement direction PD. The nozzle arrangement direction PD illustrated in FIG. 3 is the same as the conveyance direction TD, but this is not limitative. The nozzle arrangement direction PD is a direction different from the movement direction MD. The ink nozzle 20 included in the magenta ink nozzle row 20M can eject magenta ink. The magenta ink is a magenta-colored ink. The magenta ink is supplied to the printing head 18 from the ink tank or the ink cartridge not illustrated in the drawing. The magenta ink supplied to the printing head 18 is ejected by the ink nozzle 20 included in the magenta ink nozzle row 20M.

The light magenta ink nozzle row 20LM includes the plurality of ink nozzles 20 arranged along the nozzle arrangement direction PD. The ink nozzle 20 included in the light magenta ink nozzle row 20LM can eject light magenta ink. The light magenta ink is a light-magenta-colored ink. The light magenta ink is supplied to the printing head 18 from the ink tank or the ink cartridge not illustrated in the drawing. The light magenta ink supplied to the printing head 18 is ejected by the ink nozzle 20 included in the light magenta ink nozzle row 20LM.

The cyan ink nozzle row 20C includes the plurality of ink nozzles 20 arranged along the nozzle arrangement direction PD illustrated in FIG. 3. The ink nozzle 20 included in the cyan ink nozzle row 20C can eject cyan ink. The cyan ink is a cyan-colored ink. The cyan ink is supplied to the printing head 18 from the ink tank or the ink cartridge not illustrated in the drawing. The cyan ink supplied to the printing head 18 is ejected by the ink nozzle 20 included in the cyan ink nozzle row 20C.

The light cyan ink nozzle row 20LC includes the plurality of ink nozzles 20 arranged along the nozzle arrangement direction PD. The ink nozzle 20 included in the light cyan ink nozzle row 20LC can eject light cyan ink. The light cyan ink is a light-cyan-colored ink. The light cyan ink is supplied to the printing head 18 from the ink tank or the ink cartridge not illustrated in the drawing. The light cyan ink supplied to the printing head 18 is ejected by the ink nozzle 20 included in the light cyan ink nozzle row 20LC.

The yellow ink nozzle row 20Y includes the plurality of ink nozzles 20 arranged along the nozzle arrangement direction PD. The ink nozzle 20 included in the yellow ink nozzle row 20Y can eject yellow ink. The yellow ink is a yellow-colored ink. The yellow ink is supplied to the printing head 18 from the ink tank or the ink cartridge not illustrated in the drawing. The yellow ink supplied to the printing head 18 is ejected by the ink nozzle 20 included in the yellow ink nozzle row 20Y.

The black ink nozzle row 20K includes the plurality of ink nozzles 20 arranged along the nozzle arrangement direction PD. The ink nozzle 20 included in the black ink nozzle row 20K can eject black ink. The black ink is a black-colored ink. The black ink is supplied to the printing head 18 from the ink tank or the ink cartridge not illustrated in the drawing. The black ink supplied to the printing head 18 is ejected by the ink nozzle 20 included in the black ink nozzle row 20K.

The printing head 18 illustrated in FIG. 3 can eject six types of ink, but this is not limitative. The printing head 18 may be configured to eject five or less types of ink, or seven or more types of ink. It suffices that the printing head 18 can eject two or more types of ink. The number of the ink nozzles 20 included in each nozzle row illustrated in FIG. 3 is 14, but this is not limitative. The number of the ink nozzles included in each nozzle row may be smaller than 14, or may be greater than 14. The number of the ink nozzles 20 included in each nozzle row may be appropriately set. In the printing head 18 illustrated in FIG. 3, the magenta ink nozzle row 20M, the light magenta ink nozzle row 20LM, the cyan ink nozzle row 20C, the light cyan ink nozzle row 20LC, the yellow ink nozzle row the black ink nozzle row 20K are disposed in this order with respect to the movement direction MD, but this is not limitative. The arrangement order of the nozzle rows may be appropriately changed.

The magenta, light magenta, cyan, light cyan, yellow, and black are examples of the ink color, and these are not limitative. Any two of the magenta, light magenta, cyan, light cyan, yellow, and black correspond to examples of a first color and a second color.

Figure 4:
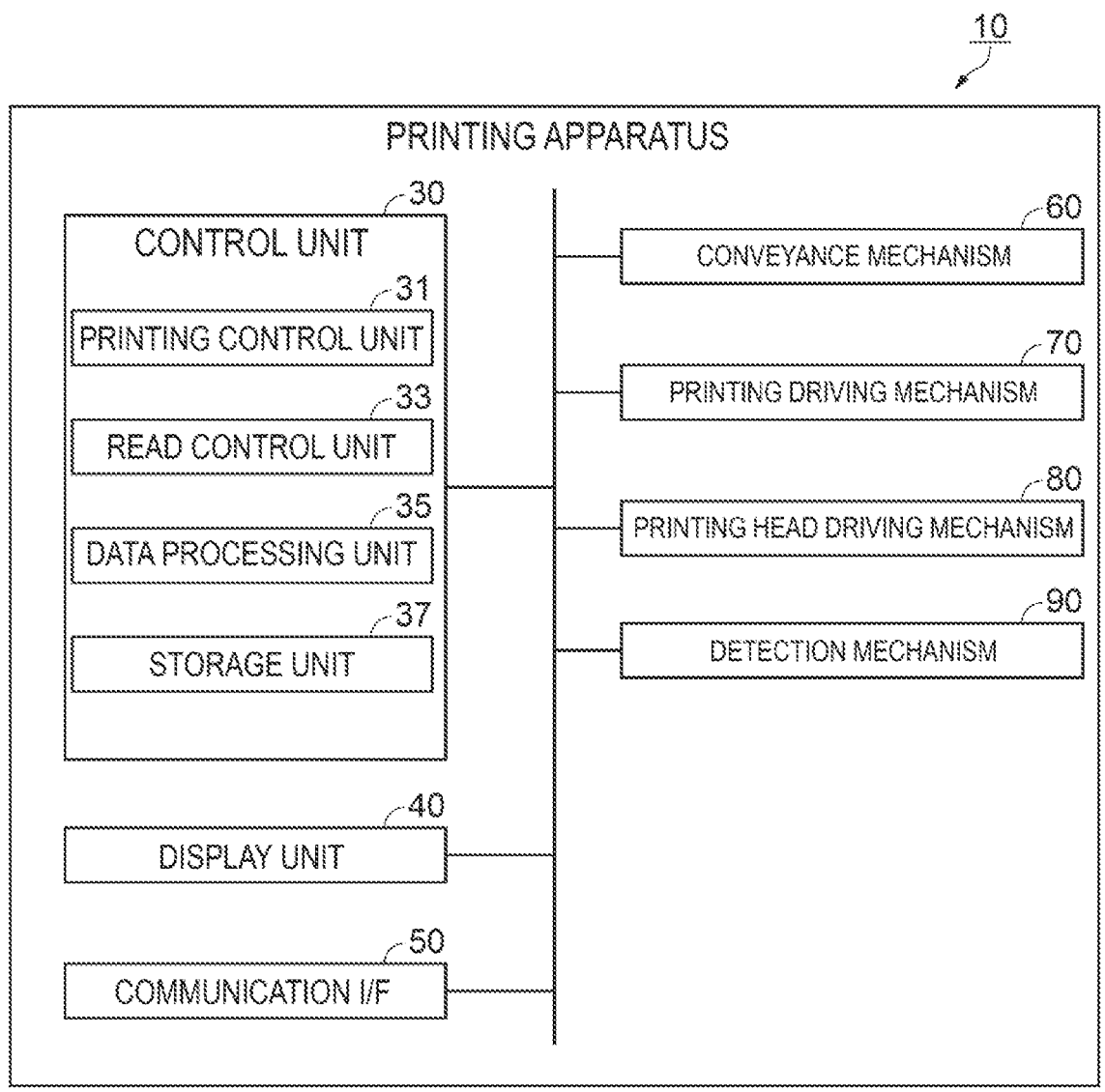
FIG. 4 is a diagram illustrating a function block of a printing apparatus.

FIG. 4 is a diagram illustrating a block configuration of the printing apparatus 10. The printing apparatus 10 includes a control unit 30, a display unit 40, a communication interface 50, a conveyance mechanism 60, a printing driving mechanism 70, a printing head driving mechanism 80, and a detection mechanism 90. FIG. 4 illustrates interface as I/F.

The control unit 30 is a controller that controls each unit of the printing apparatus 10. The control unit 30 includes a control processor such as central processing unit (CPU), a random access memory (RAM) and a read only memory (ROM). The control unit 30 operates as a functional unit by executing a program using the control processor. The RAM and the ROM function as work areas. The control unit 30 corresponds to an example of a processor.

The control unit 30 includes a storage unit 37. The storage unit 37 stores various programs such as a printing control program operated by the control unit 30, and various data. The storage unit 37 stores test pattern data and correction data described later and the like in the form of data. The RAM and the ROM may operate as the storage unit 37, or a magnetic storage device such as a hard disk drive (HDD), a semiconductor memory and the like may be provided.

The control unit 30 functions as a printing control unit 31, a read control unit 33, and a data processing unit 35 by executing the printing control program. The printing control unit 31, the read control unit 33, and the data processing unit 35 are functional units.

The printing control unit 31 controls the printing driving mechanism 70 and the printing head driving mechanism 80. The printing control unit 31 can control the printing mechanism 16 by controlling the printing driving mechanism 70 and the printing head driving mechanism 80. With the printing mechanism 16, the printing control unit 31 prints an image on the printing medium M. The printing control unit 31 acquires printing data. The printing data is stored in the storage unit 37. Alternatively, the printing data is acquired from the external apparatus through the communication interface 50. The printing control unit 31 controls the printing driving mechanism 70 and the printing head driving mechanism 80 so as to print an image on the printing medium M on the basis of the printing data.

The read control unit 33 controls various sensors such as the reading sensor 15 included in the detection mechanism 90. The read control unit 33 controls the reading sensor 15 so as to read the image printed on the printing medium M. The read image is the test pattern image 100 and the like. With the reading sensor 15, the read control unit 33 receives the read read data from the reading sensor 15. The received read data is transmitted to the data processing unit 35.

The data processing unit 35 analyses various data on the basis of the data generated by the detection mechanism 90. The data processing unit 35 receives the read data read by the reading sensor 15, and analyses the read data. When the received read data is read data obtained by reading the test pattern image 100, the data processing unit 35 analyzes the read data to specify the image position in the test pattern image 100, generate of correction data, determine defective nozzle, and the like. The data processing unit 35 corresponds to an example of an analysis unit. The read data corresponds to an example of a reading result.

The display unit 40 displays various indications under the control of the control unit 30. The display unit 40 includes a display. The display is composed of a liquid crystal display, an organic electro-luminescence (EL) or the like. The display may have a touch input function. The display unit 40 displays a setting screen for various settings such as printing conditions, an instruction screen for instructing printing, and the like.

The communication interface 50 is communicatively connected to an external apparatus not illustrated in the drawing. The communication interface 50 connects to the external apparatus in a wired or wireless manner in accordance with a predetermined communication protocol. The communication interface 50 receives printing data, a printing setting condition, a program and the like from the external apparatus. The communication interface 50 transmits the printing result, the maintenance data and the like of the printing apparatus 10 to the external apparatus.

The conveyance mechanism 60 conveys the printing medium M in the conveyance direction TD, or the direction opposite to the conveyance direction TD. The conveyance mechanism 60 includes the feed shaft 11, the feed roller pair 13, the conveyance roller pair 25, and the winding shaft 27. The conveyance mechanism 60 conveys the printing medium M under the control of the printing control unit 31 or the read control unit 33. When the printing apparatus 10 performs printing on the printing medium M, the conveyance mechanism 60 conveys the printing medium M in the conveyance direction TD under the control of the printing control unit 31. When the reading sensor 15 reads the test pattern image 100 printed on the printing medium M, the conveyance mechanism 60 conveys the printing medium M in the direction opposite to the conveyance direction TD under the control of the read control unit 33.

The printing driving mechanism 70 drives the printing mechanism 16. The printing driving mechanism 70 includes the carriage 17, a carriage driving mechanism, and the carriage support shaft 19. The printing driving mechanism 70 moves the carriage 17 in the movement direction MD. With the carriage 17 moving in the movement direction MD, the plurality of ink nozzles 20 included in the printing head 18 scan the printing medium M. With the carriage 17, the printing mechanism 16 performs the scan of the plurality of ink nozzles 20. The scanning ink nozzle 20 forms an image on the printing medium M by ejecting ink. In the case where the printing mechanism 16 is of a line head type, the printing driving mechanism 70 may operate as a correction mechanism for correcting skew of the printing medium M.

The printing head driving mechanism 80 controls the ink ejection of the ink nozzle 20 under the control of the printing control unit 31. The printing head driving mechanism 80 includes a driving element such as a piezoelectric element disposed in the printing head 18. Each ink nozzle 20 ejects ink through the driving of the printing head driving mechanism 80. The printing head driving mechanism 80 performs printing on the printing medium M by driving the plurality of ink nozzles 20. The printing head driving mechanism 80 prints the test pattern image 100 on the printing medium M by driving the plurality of ink nozzles 20.

The detection mechanism 90 detects various operations of the printing apparatus 10, the presence/absence of the printing medium M and the like. The detection mechanism 90 includes the reading sensor 15, a paper detection sensor and an ink residual quantity sensor not illustrated in the drawing, and the like. The detection mechanism 90 is driven under the control of the control unit 30. The reading sensor 15 reads the image printed on the printing medium M on the basis of the instruction of the read control unit 33 in the control unit 30. The reading operation of the reading sensor 15 corresponds to the detection operation. The detection mechanism 90 transmits detection data generated by various sensors to the control unit 30. The reading sensor 15 transmits the read data to the control unit 30.

Figure 5:
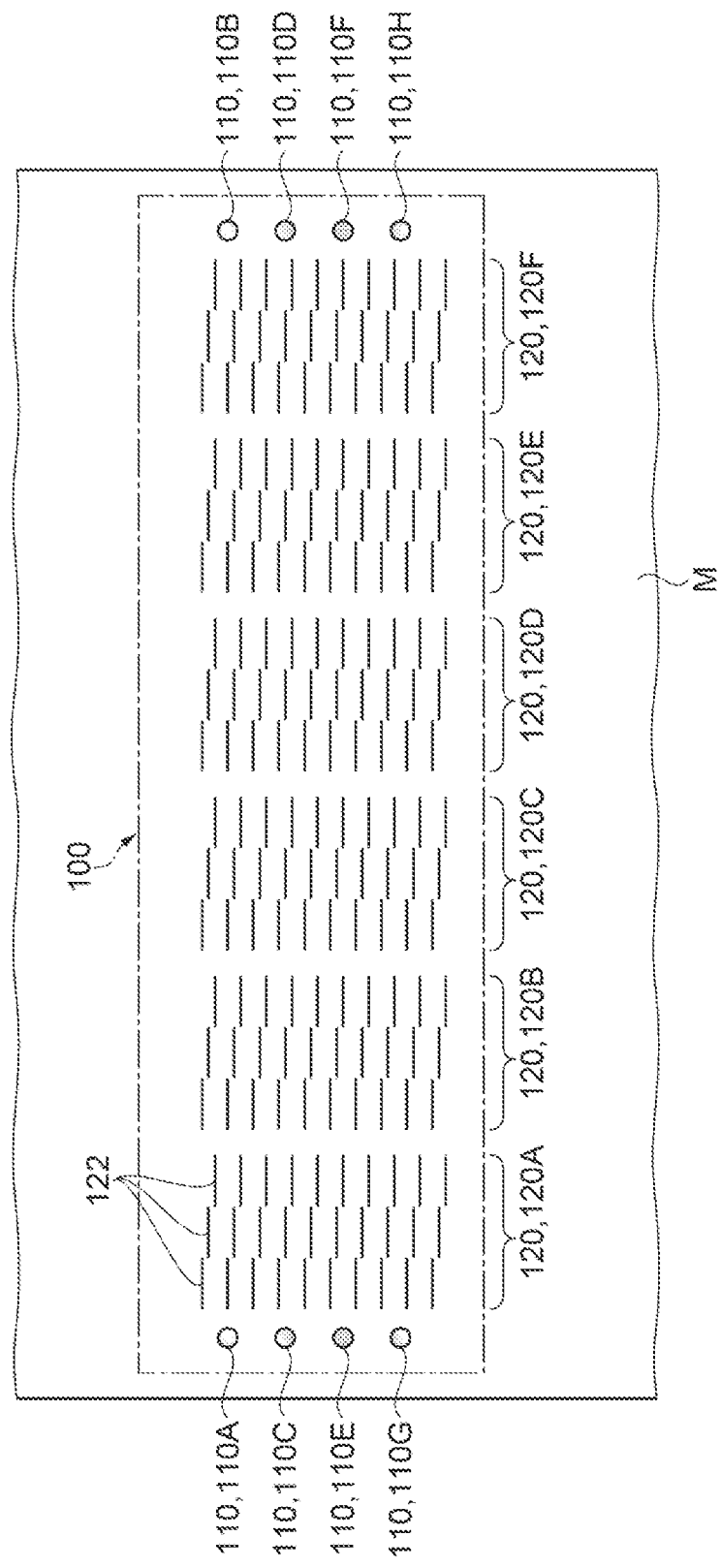
FIG. 5 is a diagram schematically illustrating a test pattern image.

FIG. 5 illustrates the test pattern image 100 printed on the printing medium M. The test pattern image 100 illustrated in FIG. 5 is printed when inspecting the ejection defect of the ink nozzle 20. The test pattern image 100 illustrated in FIG. 5 corresponds to an example of an inspection image. FIG. 5 schematically illustrates the test pattern image 100 with a part of the image omitted.

The test pattern image 100 is printed on the basis of the test pattern data stored in the storage unit 37. The test pattern data is printing data stored in the storage unit 37 in advance. The test pattern data includes information about the shape and size of each image, the relative positions of the images and the like included in the printed test pattern image 100. The test pattern data may include the color data of each image. The printing apparatus 10 reads the test pattern data stored in the storage unit 37. The printing apparatus 10 prints the test pattern image 100 on the printing medium M on the basis of the read test pattern data.

The test pattern image 100 includes a mark image 110 and a pattern image 120. The mark image 110 illustrated in FIG. 5. is composed of a plurality of circle images with a predetermined size. The mark image 110 is used when the printing apparatus 10 specifies the printing position on the printing medium M. The pattern image 120 is a pattern composed of a plurality of line images 122. The plurality of line images 122 are disposed in a step form. Each of the plurality of line images 122 is printed by one ink nozzle 20. The pattern image 120 is used when the printing apparatus 10 determines the ejection defect of the ink nozzle 20. The pattern image 120 corresponds to an example of an inspection pattern.

The mark image 110 illustrated in FIG. 5 is composed of a first mark 110A, a second mark 110B, a third mark 110C, a fourth mark 110D, a fifth mark 110E, a sixth mark 110F, a seventh mark 110G, and an eighth mark 110H. The first mark 110A, the third mark 110C, the fifth mark 110E, and the seventh mark 110G are disposed along the direction parallel to the Y axis at positions on the −X direction side of the pattern image 120. The second mark 110B, the fourth mark 110D, the sixth mark 110F, and the eighth mark 110H are disposed along the direction parallel to the Y axis at positions on the +X direction side of the pattern image 120. The plurality of circle images making up the mark image 110 illustrated in FIG. 5 are printed at positions sandwiching the pattern image 120 in the direction along the X axis. The positions and number of the circle images may be appropriately changed.

The mark image 110 illustrated in FIG. 5 are composed of eight marks, which are circle images, but this is not limitative. The number of the marks making up the mark image 110 need not be eight as long as two or more marks are provided. The marks illustrated in FIG. 5 have the same circular shape, but this is not limitative. The shapes of the plurality of marks may be the same or different as long as the printing positions of the images printed on the printing medium M can be specified. Preferably, the shapes of the plurality of marks are the same. The plurality of marks with the same shape make specifying of the printing positions of the images printed on the printing medium M of the marks easier.

The mark image 110 is printed by the black ink nozzle row 20K illustrated in FIG. 5. The color of the mark image 110 illustrated in FIG. 5 is black. The color of the mark image 110 is not limited to black. The color of the mark image 110 may be appropriately set.

The pattern image 120 illustrated in FIG. 5 includes a first pattern 120A, a second pattern 120B, a third pattern 120C, a fourth pattern 120D, a fifth pattern 120E, and a sixth pattern 120F. The first pattern 120A, the second pattern 120B, the third pattern 120C, the fourth pattern 120D, the fifth pattern 120E, and the sixth pattern 120F are sequentially printed along the +X direction. The first pattern 120A is printed at a position on the +X direction side adjacent to the first mark 110A, the third mark 110C, the fifth mark 110E, and the seventh mark 110G. In the test pattern image 100, the first pattern 120A is disposed at a position on the +X direction side adjacent to the first mark 110A, the third mark 110C, the fifth mark 110E, and the seventh mark 110G. The sixth pattern 120F is printed at a position on the −X direction side adjacent to the second mark 110B, the fourth mark 110D, the sixth mark 110F, and the eighth mark 110H. In the test pattern image 100, the sixth pattern 120F is disposed at a position on the −X direction side adjacent to the second mark 110B, the fourth mark 110D, the sixth mark 110F, and the eighth mark 110H.

The first pattern 120A, the second pattern 120B, the third pattern 120C, the fourth pattern 120D, the fifth pattern 120E, and the sixth pattern 120F are printed by respective different nozzle rows. The first pattern 120A illustrated in FIG. 5 is printed by the magenta ink nozzle row 20M. The first pattern 120A is a magenta pattern. The second pattern 120B illustrated in FIG. 5 is printed by the light magenta ink nozzle row 20LM. The second pattern 120B is a light magenta pattern. The third pattern 120C illustrated in FIG. 5 is printed by the cyan ink nozzle row 20C. The third pattern 120C is a cyan pattern. The fourth pattern 120D illustrated in FIG. 5 is printed by the light cyan ink nozzle row 20LC. The fourth pattern 120D is a light cyan pattern. The fifth pattern 120E illustrated in FIG. 5 is printed by the yellow ink nozzle row 20Y. The fifth pattern 120E is a yellow pattern. The sixth pattern 120F illustrated in FIG. 5 is printed by the black ink nozzle row 20K. The sixth pattern 120F is a black pattern. The pattern image 120 is printed by all nozzle rows. Each pattern is printed by all ink nozzles 20 included in each nozzle row.

The first pattern 120A, the second pattern 120B, the third pattern 120C, the fourth pattern 120D, the fifth pattern 120E, and the sixth pattern 120F may be printed in colors different from the above-described colors. The color of each pattern may be appropriately set.

Figure 6:
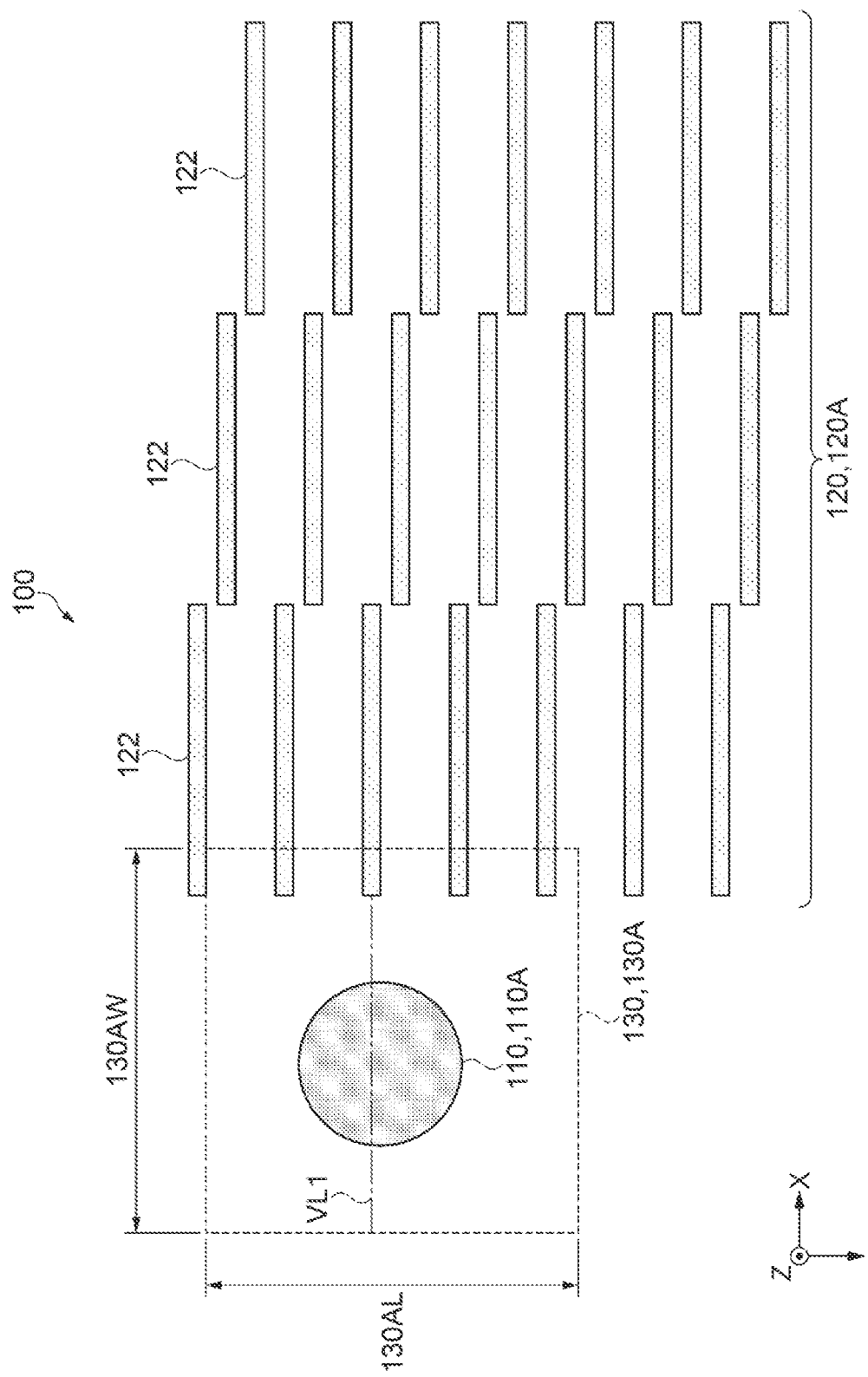
FIG. 6 is an enlarged view of a test pattern image including a first mark.

FIG. 6 is an enlarged view of the test pattern image 100 including the first mark 110A. FIG. 6 illustrates the first mark 110A, and the first pattern 120A adjacent to the first mark 110A. The first mark 110A corresponds to an example of a first position detection mark. In addition, FIG. 6 illustrates a first measurement region 130A. The first measurement region 130A is one of a plurality of measurement regions 130. The measurement region 130 illustrates a range that is measured when the data processing unit 35 specifies the positions of a plurality of marks included in the test pattern image 100. The color of the first mark 110A illustrated in FIG. 6 is black. The black corresponds to an example of a first color. The first pattern 120A illustrated in FIG. 6 is composed of the plurality of line images 122. The color of the first pattern 120A illustrated in FIG. 6 is magenta. The magenta corresponds to an example of a second color. The first pattern 120A corresponds to an example of a second color inspection pattern.

The data processing unit 35 specifies the position of each mark in the read data read by the reading sensor 15. The data processing unit 35 determines the density distribution in the measurement region 130 with a range of a predetermined size in the read data as the measurement region 130. The printing start position of the test pattern image 100 is controlled by the printing control unit 31. The read start position of the reading sensor 15 is controlled by the read control unit 33. On the other hand, the printing medium M may not be conveyed to an estimated position due to skew, slip of the feed roller pair 13 and the like. The data processing unit 35 specifies the position of each mark by determining the density distribution in the measurement region 130 with a predetermined size, for example.

The first measurement region 130A illustrated in FIG. 6 indicates a range for measuring the density distribution of the first mark 110A. The first measurement region 130A is a region with a first measurement region width 130AW in the direction parallel to the X axis and a first measurement region length 130AL in the direction parallel to the Y axis. The first measurement region 130A corresponds to an example of a first region.

Figure 7:
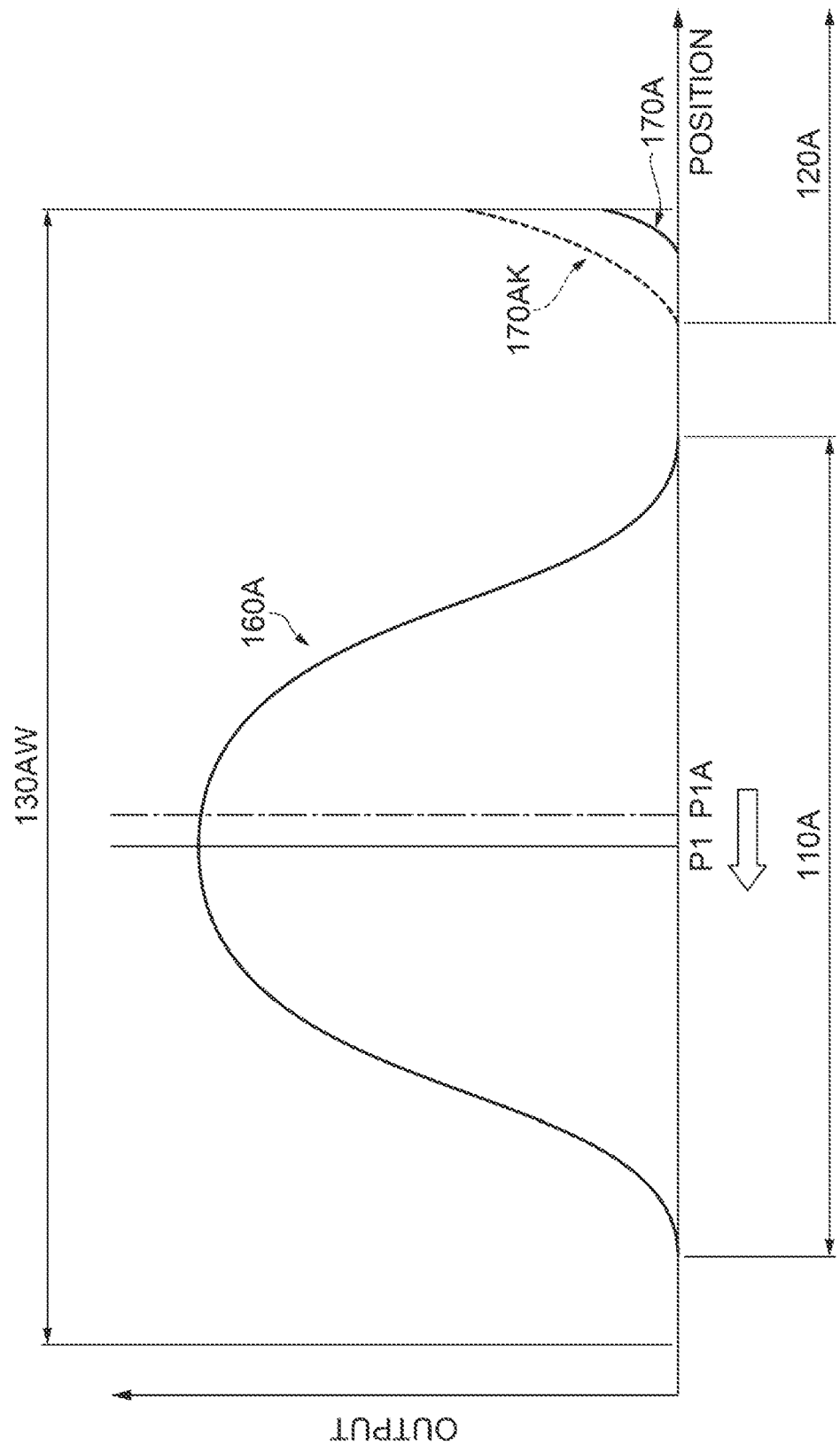
FIG. 7 is a diagram illustrating a density distribution of a first measurement region.

FIG. 7 illustrates a density distribution in the first measurement region 130A. FIG. 7 illustrates a density distribution on a first virtual line VL1 illustrated in FIG. 6. The first virtual line VL1 is a virtual line parallel to the X axis. The data processing unit 35 measures the density distribution in the first measurement region 130A including the density distribution on the first virtual line VL1. FIG. 7 illustrates a first mark density distribution 160A corresponding to the first mark 110A and a first pattern density distribution 170A corresponding to the first pattern 120A.

As an example, the data processing unit 35 specifies the position of the first mark 110A by determining the density gravity center in the first measurement region 130A. The position of the first mark 110A corresponds to an example of a first position of the first position detection mark. As illustrated in FIG. 6, the first pattern 120A is included in the first measurement region 130A. As illustrated in FIG. 7, the first pattern density distribution 170A is included in the first measurement region width 130AW.

FIG. 7 illustrates a virtual first pattern density distribution 170AK. The virtual first pattern density distribution 170AK is an output value of a case where the first pattern 120A is printed by the black ink nozzle row 20K. The color of the first pattern 120A is black. When the color of the first pattern 120A is black, the density gravity center of the first measurement region 130A is a virtual gravity center PIA as illustrated in FIG. 7.

Since the color of the first pattern 120A is magenta, the first pattern density distribution 170A is smaller than the virtual first pattern density distribution 170AK. The density gravity center position of the first measurement region 130A is a first mark gravity center P1 as illustrated in FIG. 7. The first mark gravity center P1 corresponds to the first position of the first position detection mark. The color of the first mark 110A and the color of the first pattern 120A adjacent to the first mark 110A are different from each other. Since the influence of the first pattern density distribution 170A on the first mark gravity center P1 is small, the data processing unit 35 can more correctly specify the position of the first mark 110A. In addition, since the influence of the first pattern density distribution 170A on the data processing unit 35 is small, the first measurement region 130A can be set to a wide region. When the first measurement region 130A is wide, the data processing unit 35 can reliably specify the position of the first mark 110A.

The data processing unit 35 analyzes the density distribution of the first mark 110A by using the red channel included in the read data. Since the red channel is light reception data obtained when the light emission unit emits red light, the magenta first pattern 120A reflects a large quantity of red light, while the black first mark 110A absorbs the light. Thus, when the data processing unit 35 estimates the density distribution on the basis of the reflection light printed on the white printing medium M, the output value of the density distribution of the black first mark 110A is high, for example. On the other hand, the reflection light of the white printing medium M that also reflects red light is mixed with the reflection light to the magenta first pattern A, and therefore the output value of the density distribution of the first pattern A is small. That is, when the data processing unit 35 analyzes it by using the red channel, the output value of the first pattern density distribution 170A is further reduced. The red corresponds to an example of a color according to magenta. The data processing unit 35 can suppress the influence of the magenta first pattern 120A adjacent to the first mark 110A. The red channel corresponds to an example of a first channel obtained by extracting the color according the first color. Note that, while the white printing medium M is described as an example for the sake of clarity, the color of the printing medium is not limited to white since it suffices that the reading sensor 15 performs the reading with a color channel with which the gap between the reflection light of the first mark 110A and the reflection light of the first pattern 120A is large on the basis of the above-described concept.

When analyzing the magenta first pattern 120A, the data processing unit 35 uses the green channel obtained by extracting the green component. By using the green channel, the data processing unit 35 can suppress the influence of the second pattern 120B adjacent to the first pattern 120A and the like and can perform the analysis with high accuracy. The green corresponds to an example of a color different from the color according to the second color. The green channel corresponds to an example of a second channel obtained by extracting a color different from the color according to the second color.

The read data includes the red channel obtained by extracting red. Preferably, the data processing unit 35 analyzes the first mark 110A by using the red channel. In addition, the read data includes the green channel obtained by extracting green different from red. Preferably, the data processing unit 35 analyzes the magenta first pattern 120A by using the green channel.

When specifying the position of the first mark 110A, the printing apparatus 10 can reduce the influence of the color of the first pattern 120A.

The color of the first mark 110A is not limited to black. The color of the first pattern 120A is not limited to magenta.

For example, the first mark 110A may be printed in magenta. The first pattern 120A may be printed in cyan. The data processing unit 35 analyzes the first mark 110A by using the green channel, and analyzes the first pattern 120A by using the red channel. Preferably, the data processing unit 35 performs the analyzation by appropriately selecting the red channel, the green channel, and the blue channel in accordance with the color of the mark and the pattern to be analyzed.

When the data processing unit 35 performs the analyzation by using the red channel, the green channel, and the blue channel, it is preferable that the color of each pattern included in the test pattern image 100 be adjusted in advance. For example, when the first pattern 120A is magenta, it is preferable that the second pattern 120B be cyan. The cyan corresponds to an example of a third color. It is preferable that the color of the second pattern 120B adjacent to the first pattern 120A be a color close to the complementary color of the color of the first pattern 120A. The setter of the test pattern image 100 sets in advance the color of the second pattern 120B adjacent to the first pattern 120A to a color close to the complementary color. When analyzing the first pattern 120A, the data processing unit 35 can perform the analysis with the influence of the cyan second pattern 120B suppressed by using the green channel.

While the first mark density distribution 160A is determined in the first measurement region 130A in FIG. 6 and FIG. 7, this is not limitative. The density distribution of any one of the second mark 110B, the third mark 110C, the fourth mark 110D, the fifth mark 110E, the sixth mark 110F, the seventh mark 110G, and the eighth mark 110H is measured in the first measurement region 130A.

Figure 8:
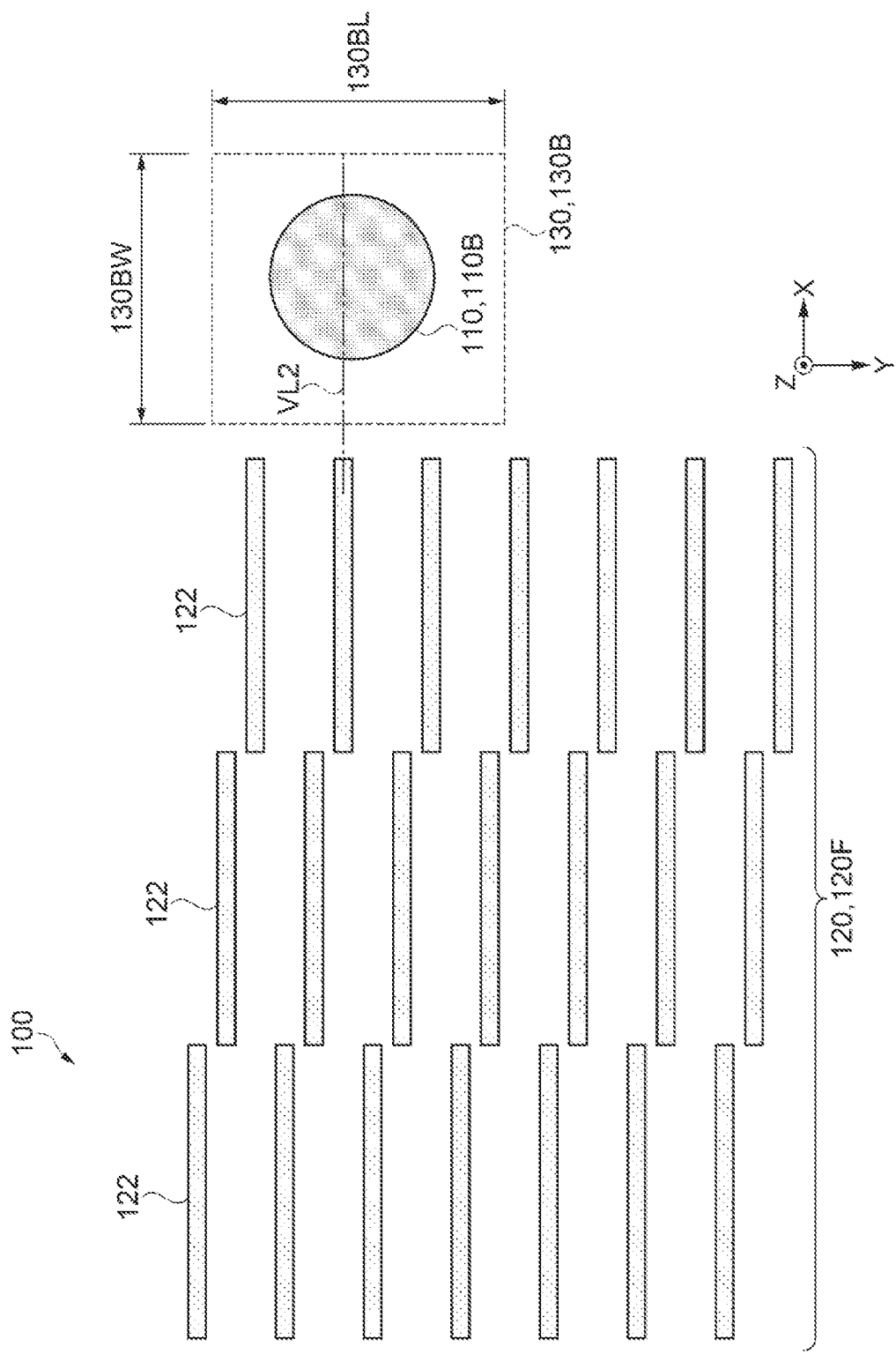
FIG. 8 is an enlarged view of a test pattern image including a second mark.

FIG. 8 is an enlarged view of the test pattern image 100 including the second mark 110B. FIG. 8 illustrates the second mark 110B and the sixth pattern 120F adjacent to the second mark 110B. The second mark 110B corresponds to an example of a second position detection mark. In addition, FIG. 8 illustrates a second measurement region 130B. The second measurement region 130B is one of the plurality of measurement regions 130. The color of the second mark 110B illustrated in FIG. 8 is black. The sixth pattern 120F illustrated in FIG. 8 is composed of the plurality of line images 122. The color of the sixth pattern 120F illustrated in FIG. 8 is black.

The second measurement region 130B illustrated in FIG. 8 represents a range for measuring the density distribution of the second mark 110B. The second measurement region 130B is a region with a second measurement region width 130BW in the direction parallel to the X axis and a second measurement region length 130BL in the direction parallel to the Y axis. The second measurement region 130B corresponds to an example of a second region.

The second measurement region 130B is smaller than the first measurement region 130A. The second measurement region width 130BW illustrated in FIG. 8 is shorter than the first measurement region width 130AW. The second measurement region length 130BL illustrated in FIG. 8 is shorter than the first measurement region length 130AL. The area of the second measurement region 130B is smaller than the area of the first measurement region 130A.

The storage unit 37 stores the test pattern data in advance. The test pattern data includes information about the relative position of each pattern and each mark. The data processing unit 35 can estimate the position of the second mark 110B with high accuracy by specifying the position of the first mark 110A. The data processing unit 35 can specify the position of the second mark 110B in the second measurement region 130B smaller than the first measurement region 130A. The position of the second mark 110B corresponds to an example of a second position of the second position detection mark.

Figure 9:
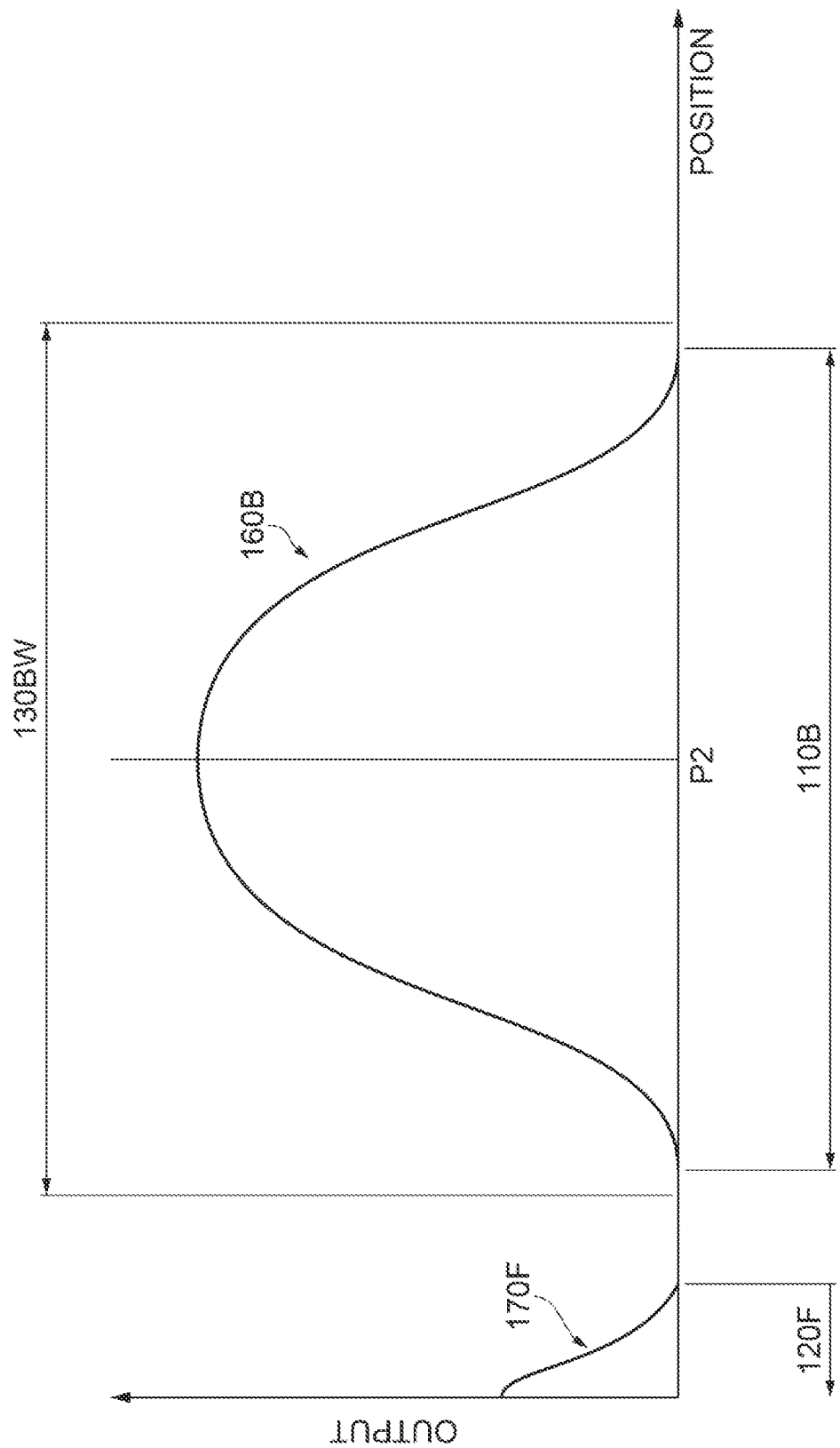
FIG. 9 is a diagram illustrating a density distribution of a second measurement region.

FIG. 9 is a diagram illustrating a density distribution in the second measurement region 130B. FIG. 9 illustrates a density distribution on a second virtual line VL2 illustrated in FIG. 8. The second virtual line VL2 is a virtual line parallel to the X axis. The data processing unit 35 measures the density distribution in the second measurement region 130B including the density distribution on the second virtual line VL2. FIG. 9 illustrates a second mark density distribution 160B corresponding to the second mark 110B and a sixth pattern density distribution 170F corresponding to the sixth pattern 120F.

The data processing unit 35 specifies the position of the second mark 110B by determining the density gravity center in the second measurement region 130B, for example. As illustrated in FIG. 8, the sixth pattern 120F is not included in the second measurement region 130B. As illustrated in FIG. 9, the sixth pattern density distribution 170F is not included in the second measurement region width 130BW. The data processing unit 35 can specify a second mark gravity center P2 with high accuracy.

Since the second measurement region 130B is smaller than the first measurement region 130A, the data processing unit is less affected by the sixth pattern 120F adjacent to the second mark 110B. In addition, the setter of the test pattern image 100 can set black as the color of the sixth pattern 120F adjacent to the second mark 110B.

While the second mark density distribution 160B is determined in the second measurement region 130B in FIG. 8 and FIG. 9, this is not limitative. When the position of the first mark 110A is specified by the first measurement region 130A, the position of the third mark 110C, the position of the fourth mark 110D, the position of the fifth mark 110E, the position of the sixth mark 110F, the position of the seventh mark 110G, and the position of the eighth mark 110H may be specified in the measurement region 130 with the same size as the second measurement region 130B.

As described above, the printing apparatus 10 includes the printing mechanism 16 that prints the test pattern image 100, the reading sensor 15 that reads the test pattern image 100 printed by the printing mechanism 16, and the data processing unit 35 that performs analyzation on the basis of the read data read by the reading sensor 15. The test pattern image 100 includes the first mark 110A printed in black, the second mark 110B printed in black, and the pattern image 120 of a plurality of colors including the first pattern 120A printed in magenta different from black. The printing mechanism 16 prints the first pattern 120A at a position adjacent to the first mark 110A. The data processing unit 35 specifies the position of the first mark 110A in the first measurement region 130A. The data processing unit 35 specifies the position of the second mark 110B in the second measurement region 130B smaller than the first measurement region 130A.

When specifying the position of the first mark 110A, the printing apparatus 10 can reduce the influence of the first pattern 120A. In addition, when specifying the position of the second mark 110B, the printing apparatus 10 can reduce the influence of the sixth pattern 120F. The printing apparatus 10 can specify the position of the first mark 110A and the position of the second mark 110B with high accuracy.

FIG. 6 and FIG. 8 illustrate circle images with a predetermined size as the first mark 110A and the second mark 110B. The shapes of the first mark 110A and the second mark 110B are not limited to the circle images. The shapes of the first mark 110A and the second mark 110B may be a mark with a predetermined shape such as a crossmark with two intersecting lines. The data processing unit 35 estimates the shape of the mark in accordance with the output value of the read data. The data processing unit 35 may specify the position of the mark on the basis of the estimated shape of the mark.

Preferably, the data processing unit 35 specifies the positions of the first mark 110A and the second mark 110B by determining the density distribution of the mark. The data processing unit 35 can easily specify the positions of the first mark 110A and the second mark 110B. With the data processing unit 35 that determines the position of the mark based on the density distribution of the mark, the setter of the test pattern image 100 can use a circle image as the mark image 110. When the mark image 110 is tilted at the time of printing, the data processing unit 35 is less affected by the tilt.

The data processing unit 35 of the printing apparatus 10 specifies the position of the first mark 110A on the basis of the density distribution of the black in the first measurement region 130A, and specifies the position of the second mark 110B on the basis of the density distribution of the black in the second measurement region 130B.

The printing apparatus 10 specifies the position of the first mark 110A and the position of the second mark 110B on the basis of the density distribution, and thus can accurately specify the positions.

In the test pattern image 100 illustrated in FIG. 5, the first mark 110A, the first pattern 120A, the second pattern 120B, the third pattern 120C, the fourth pattern 120D, the fifth pattern 120E, the sixth pattern 120F, and the second mark 110B are printed in this order in the direction parallel to the X axis. The first mark 110A and the second mark 110B are printed with the pattern image 120 sandwiched therebetween in the direction parallel to the X axis. With the first mark 110A and the second mark 110B located at the positions sandwiching the pattern image 120 therebetween, the accuracy of specifying the position of each image forming the pattern image 120 is improved.

The printing mechanism 16 of the printing apparatus 10 prints the pattern image 120 between the first mark 110A and the second mark 110B in the direction parallel to the X axis.

Figure 10:
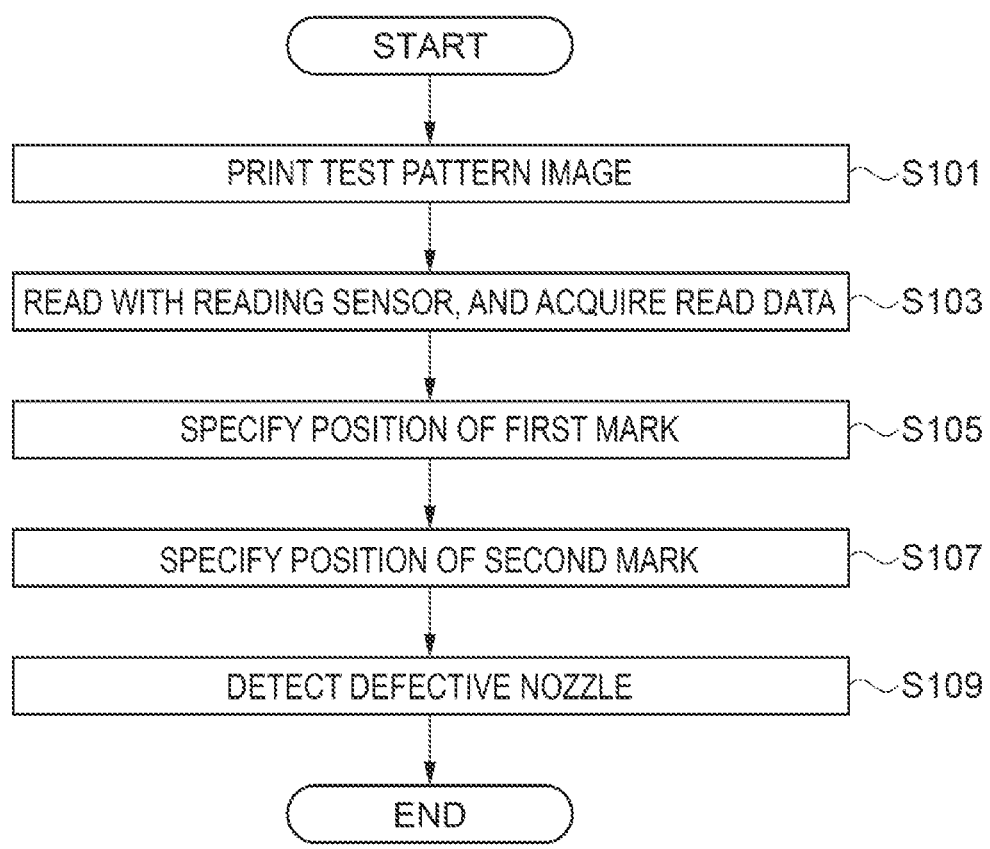
FIG. 10 is a flowchart illustrating image processing performed by a printing apparatus.

FIG. 10 is a flowchart illustrating image processing performed at the printing apparatus 10. The image processing method illustrated in FIG. 10 is performed when the control unit 30 executes a printing control program. The printing control program corresponds to an example of an image processing program.

At step S101, the printing apparatus 10 prints the test pattern image 100. The printing apparatus 10 prints the test pattern image 100 on the basis of the test pattern data stored in the storage unit 37. As illustrated in FIG. 5, the test pattern image 100 includes the first mark 110A, the second mark 110B, and the pattern image 120. The first mark 110A is printed with the black ink nozzle row 20K. The first mark 110A is black. The second mark 110B is printed with the black ink nozzle row 20K. The second mark 110B is black.

The test pattern image 100 includes the third mark 110C, the fourth mark 110D, the fifth mark 110E, the sixth mark 110F, the seventh mark 110G, and the eighth mark 110H. The third mark 110C, the fourth mark 110D, the fifth mark 110E, the sixth mark 110F, the seventh mark 110G, and the eighth mark 110H are printed with the black ink nozzle row 20K. The third mark 110C, the fourth mark 110D, the fifth mark 110E, the sixth mark 110F, the seventh mark 110G, and the eighth mark 110H are black.

The pattern image 120 includes the first pattern 120A, the second pattern 120B, the third pattern 120C, the fourth pattern 120D, the fifth pattern 120E, and the sixth pattern 120F. The first pattern 120A is printed with the magenta ink nozzle row 20M. The first pattern 120A is a magenta pattern. The second pattern 120B is printed with the light magenta ink nozzle row 20LM. The second pattern 120B is a light magenta pattern. The third pattern 120C is printed with the cyan ink nozzle row 20C. The third pattern 120C is a cyan pattern. The fourth pattern 120D is printed with the light cyan ink nozzle row 20LC. The fourth pattern 120D is a light cyan pattern. The fifth pattern 120E is printed with the yellow ink nozzle row The fifth pattern 120E is a yellow pattern. The sixth pattern 120F is printed with the black ink nozzle row 20K. The sixth pattern 120F is a black pattern.

The first pattern 120A is disposed at a position adjacent to the first mark 110A, the third mark 110C, the fifth mark 110E, and the seventh mark 110G. The sixth pattern 120F is disposed at a position adjacent to the second mark 110B, the fourth mark 110D, the sixth mark 110F, and the eighth mark 110H.

After printing the test pattern image 100, the printing apparatus 10 reads the test pattern image 100 with the reading sensor 15 at step S103. The reading sensor 15 generates read data by reading the test pattern image 100. The read data includes the red channel, the green channel, and the blue channel. The data processing unit 35 acquires the read data generated by the reading sensor 15.

After acquiring the read data, the printing apparatus specifies the position of the first mark 110A at step S105. The position of the first mark 110A is a printing position on the printing medium M. The data processing unit 35 estimates the position of the first mark 110A on the basis of the printing control data used at the printing control unit 31. The printing control data is control data generated based on the test pattern data, which is the printing data. The data processing unit 35 measures the density distribution of the black in the first measurement region 130A including the estimated position. As illustrated in FIG. 6, the first measurement region 130A is a region with the first measurement region width 130AW and the first measurement region length 130AL. The data processing unit calculates the density gravity center of the density distribution of the black. The data processing unit 35 specifies the position of the first mark 110A by calculating the density gravity center.

After specifying the position of the first mark 110A, the printing apparatus 10 specifies the position of the second mark 110B at step S107. The position of the second mark 110B is a printing position on the printing medium M. The data processing unit 35 estimates the position of the second mark 110B on the basis of the specified position of the first mark 110A. The data processing unit 35 measures the density distribution of the black in the second measurement region 130B including the estimated position. As illustrated in FIG. 8, the second measurement region 130B is a region with the second measurement region width 130BW and the second measurement region length 130BL. The second measurement region 130B is smaller than the first measurement region 130A. The position of the second mark 110B is estimated on the basis of the specified position of the first mark 110A, and thus the estimated position of the second mark 110B can be estimated with high accuracy. Even when the second measurement region 130B is smaller than the first measurement region 130A, the data processing unit 35 can specify the position of the second mark 110B. The data processing unit 35 calculates the density gravity center of the density distribution of the black. The data processing unit 35 specifies the position of the second mark 110B by calculating the density gravity center.

The position of the first mark 110A is specified on the basis of the density distribution of the black in the first measurement region 130A, and the position of the second mark 110B is specified on the basis of the density distribution of the black in the second measurement region 130B.

The printing apparatus 10 specifies the position of the first mark 110A and the position of the second mark 110B on the basis of the density distribution, and thus can accurately specify the positions.

Figure 11:
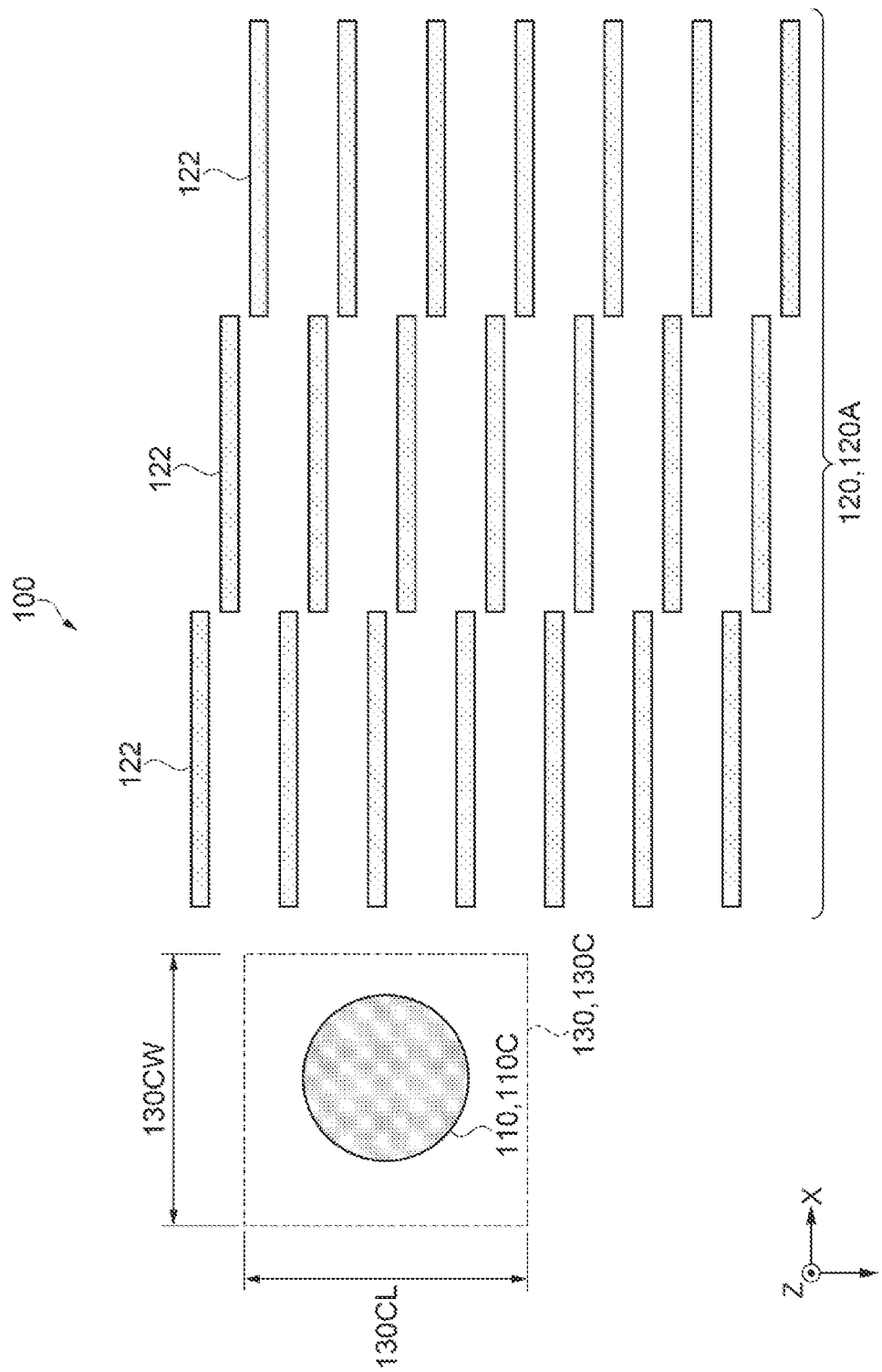
FIG. 11 is an enlarged view of a test pattern image including a third mark.

The printing apparatus 10 may specify the position of the third mark 110C. FIG. 11 is an enlarged view of the test pattern image 100 including the third mark 110C. FIG. 11 includes the third mark 110C and the first pattern 120A adjacent to the third mark 110C. The first pattern 120A is composed of the plurality of line images 122. The third mark 110C corresponds to an example of a third position detection mark. The position of the third mark 110C corresponds to an example of a third position of the third position detection mark. The position of the third mark 110C is a printing position on the printing medium M. The data processing unit 35 estimates the position of the third mark 110C on the basis of the specified position of the first mark 110A. The data processing unit 35 measures the density distribution of the black in the third measurement region 130C including the estimated position. As illustrated in FIG. 11, the third measurement region 130C is a region with a third measurement region width 130CW and a third measurement region length 130CL. The third measurement region 130C corresponds to an example of a third region. The third measurement region 130C may have the same size as the second measurement region 130B. The third measurement region width 130CW may have the same width as the second measurement region width 130BW. The third measurement region length 130CL may have the same length as the second measurement region length 130BL. The third measurement region 130C may be smaller than the first measurement region 130A. The position of the third mark 110C is estimated on the basis of the specified position of the first mark 110A, and thus the estimated position of the third mark 110C is estimated with high accuracy. Even in the case where the third measurement region 130C is smaller than the first measurement region 130A, the data processing unit 35 can specify the position of the third mark 110C. The data processing unit 35 calculates the density gravity center of the density distribution of the black. By calculating the density gravity center, the data processing unit 35 specifies the position of the third mark 110C.

As with the third mark 110C, the printing apparatus 10 specifies the positions of the fourth mark 110D, the fifth mark 110E, the sixth mark 110F, the seventh mark 110G, and the eighth mark 110H.

The printed test pattern image 100 includes the third mark 110C different from the first mark 110A and the second mark 110B. The printing apparatus 10 specifies the position of the third mark 110C in the third measurement region 130C smaller than the first measurement region 130A. Preferably, the printing apparatus 10 specifies the position of the third mark 110C in the third measurement region 130C with the same size as the second measurement region 130B.

The printing apparatus 10 can detect the position of the third mark 110C while suppressing the influence of the first pattern 120A adjacent to the third mark 110C.

After specifying the position of the second mark 110B, the printing apparatus 10 determines the defective nozzle at step S109. The data processing unit 35 specifies the position of each line image 122 in the pattern image 120 on the basis of the position of the second mark 110B and the position of the first mark 110A specified. The data processing unit 35 compares the specified position of each line image 122 with the reference position of each line image 122 that in estimated in advance. The data processing unit 35 determines the defective nozzle on the basis of the difference between the position of specified each line image 122 and the reference position each line image 122 estimated in advance. The data processing unit 35 specifies the position of each line image 122 on the basis of the first mark 110A and the second mark 110B. The data processing unit 35 can specify the position of each line image 122 with high accuracy. The printing apparatus 10 can determine not only the non-ejection of ink of the ink nozzle 20, but also the jetting curve of the ink ejected from the ink nozzle 20.

The test pattern image 100 including the pattern image 120 of a plurality of colors including the first mark 110A formed in black, the second mark 110B formed in black, and the first pattern 120A formed in magenta different from black is printed with the first pattern 120A disposed at a position adjacent to the first mark 110A, read data is acquired by reading the test pattern image 100, the position of the first mark 110A is specified in the first measurement region 130A, and the position of the second mark 110B in the second measurement region 130B smaller than the first measurement region 130A is specified.

When specifying the position of the first mark 110A, the printing apparatus 10 can reduce the influence of the color of the first pattern 120A. In addition, when specifying the position of the second mark 110B, the printing apparatus 10 can reduce the influence of the sixth pattern 120F. The printing apparatus 10 can specify the position of the first mark 110A and the position of the second mark 110B with high accuracy.

The printing control program is executed by the control unit 30 of the printing apparatus 10 that prints the test pattern image 100, the printing control program is caused to print the test pattern image 100 including the pattern image 120 of a plurality of colors including the first mark 110A formed in black, the second mark 110B formed in black, and the first pattern 120A formed in magenta different from black such that the first pattern 120A is disposed at a position adjacent to the first mark 110A, acquire the read data by reading the test pattern image 100, specify the position of the first mark 110A with the first measurement region 130A, and specify the position of the second mark 110B in the second measurement region 130B smaller than the first measurement region 130A of the read data.

When specifying the position of the first mark 110A, the printing apparatus 10 can reduce the influence of the color of the first pattern 120A. In addition, when specifying the position of the second mark 110B, the printing apparatus 10 can reduce the influence of the sixth pattern 120F. The printing apparatus 10 can specify the position of the first mark 110A and the position of the second mark 110B with high accuracy.

The pattern image 120 is not limited to the step pattern illustrated in FIG. 5. The pattern image 120 may be appropriately changed as long as the image is an image used for evaluation on the printing apparatus 10 such as a patch image for evaluating the color gradation. Here, it suffices that the image adjacent to the mark image 110 is an image with a color different from the mark image 110.

The term "adjacent" in this specification is not limited to an adjoining position. In addition, the mark image 110 and the image used for the evaluation need not necessarily be adjacent to each other in the X direction as illustrated in the drawing. The mark image 110 and the image used for the evaluation are regarded to be adjacent to each other when they are close to each other to a certain degree and the detection accuracy of the mark image 110 is reduced by their positional relationship or the influence of the color.

What is claimed is:

1. A liquid ejection apparatus, comprising:
a printing unit configured to print an inspection image;
a reading unit configured to read the inspection image printed by the printing unit; and
an analysis unit configured to perform analyzation based on a reading result read by the reading unit, wherein
the printing unit prints the inspection image including
a first position detection mark printed in a first color,
a second position detection mark printed in the first color, and
an inspection pattern image including a plurality of inspection patterns of a plurality of colors, the plurality of inspection patterns including at least a second color inspection pattern printed in a second color different from the first color, and a different inspection pattern different from the second color inspection pattern,
the printing unit prints the inspection image such that
the first position detection mark is located at a first end portion of the inspection image in a predetermined direction and adjacent to the second color inspection pattern in the predetermined direction,
the second position detection mark is located at a second end portion of the inspection image in the predetermined direction and adjacent to the different inspection pattern in the predetermined direction, the second end portion is opposite to the first end portion in the predetermined direction, and
the plurality of inspection patterns are located between the first position detection mark and the second position detection mark in the predetermined direction, and
the analysis unit specifies a first position of the first position detection mark in a first region, and specifies a second position of the second position detection mark in a second region smaller than the first region.

2. The liquid ejection apparatus according to claim 1, wherein
the analysis unit specifies the first position based on a density distribution of the first color in the first region, and
the analysis unit specifies the second position based on a density distribution of the first color in the second region.

3. The liquid ejection apparatus according to claim 1, wherein
the reading result includes a first channel obtained by extracting a color according to the second color, and
the analysis unit analyzes the first position detection mark by using the first channel.

4. The liquid ejection apparatus according to claim 1, wherein
the inspection pattern image further includes a third color inspection pattern printed in a third color different from the second color, the reading result includes a second channel obtained by extracting a color different from a color according to the second color, and
the analysis unit analyzes the second color inspection pattern by using the second channel.

5. The liquid ejection apparatus according to claim 1, wherein
the first position detection mark and the second position detection mark have a same shape.

6. An image processing method, comprising:
printing an inspection image including
a first position detection mark formed in a first color,
a second position detection mark formed in the first color, and
an inspection pattern image including a plurality of inspection patterns of a plurality of colors, the plurality of inspection patterns including at least a second color inspection pattern formed in a second color different from the first color, and a different inspection pattern different from the second color inspection pattern;
acquiring a reading result by reading the inspection image;
specifying a first position of the first position detection mark in a first region; and
specifying a second position of the second position detection mark in a second region smaller than the first region,
the inspection image being printed such that
the first position detection mark is located at a first end portion of the inspection image in a predetermined direction and adjacent to the second color inspection pattern in the predetermined direction,
the second position detection mark is located at a second end portion of the inspection image in the predetermined direction and adjacent to the different inspection pattern in the predetermined direction, the second end portion is opposite to the first end portion in the predetermined direction, and
the plurality of inspection patterns are located between the first position detection mark and the second position detection mark in the predetermined direction.

7. The image processing method according to claim 6, wherein
the printed inspection image includes a third position detection mark different from the first position detection mark and the second position detection mark, and
a third position corresponding to the third position detection mark is specified in a third region smaller than the first region.

8. The image processing method according to claim 7, wherein
the second region and the third region have a same size.

9. The image processing method according to claim 6, wherein
the first position is specified based on a density distribution of the first color in the first region, and
the second position is specified based on a density distribution of the first color in the second region.

10. A non-transitory computer-readable storage medium storing an image processing program executed by a processor of a liquid ejection apparatus configured to print an inspection image, the image processing program being configured to:
print the inspection image including
a first position detection mark formed in a first color, a second position detection mark formed in the first color, and an inspection pattern image including a plurality of inspection patterns of a plurality of colors, the plurality of inspection patterns including at least a second color inspection pattern formed in a second color different from the first color, and a different inspection pattern different from the second color inspection pattern, acquire a reading result by reading the inspection image;

specify a first position of the first position detection mark in a first region; and specify a second position of the second position detection mark in a second region smaller than the first region, the inspection image being printed such that
- the first position detection mark is located at a first end portion of the inspection image in a predetermined direction and adjacent to the second color inspection pattern in the predetermined direction,
- the second position detection mark is located at a second end portion of the inspection image in the predetermined direction and adjacent to the different inspection pattern in the predetermined direction, the second end portion is opposite to the first end portion in the predetermined direction, and
- the plurality of inspection patterns are located between the first position detection mark and the second position detection mark in the predetermined direction.

* * * * *